Patented Mar. 13, 1934

1,950,435

UNITED STATES PATENT OFFICE

1,950,435

CATALYTIC PROCESS FOR PREPARING HALOGEN BUTADIENES

Arnold M. Collins, Wilmington, Del., assignor to E. I. du Pont de Nemours & Company, Wilmington, Del., a corporation of Delaware No Drawing. Application May 7, 1931, Serial No. 535,805

20 Claims. (Cl. 260—162)

This invention relates to a novel chemical synthesis, and pertains specifically to the preparation of halogen derivatives of butadiene.

Prior art

It has been disclosed, in an application to J. A. Nieuwland, Ser. No. 305,866, filed September 13, 1928, issued as Patent No. 1,811,959 on June 30, 1931 that acetylene will polymerize, in the presence of catalysts discovered by him, to form open chain polymers. In a preferred form, Nieuwland passed acetylene through a catalyst comprising an aqueous solution saturated with ammonium chloride and cuprous chloride in the presence of an undissolved excess of cuprous salt and copper powder, the latter serving to maintain the copper salt in the cuprous state. Under these conditions, Nieuwland found that acetylene polymerizes to form a mixture of open chain compounds, one of which has the empirical formula $C_8H_8$ and is termed the tetramer of acetylene, another of which has the empirical formula $C_6H_6$, termed divinylacetylene and found to have the structural formula $H_2C=HC-C\equiv C-CH=CH_2$, and a third compound having the empirical formula $C_4H_4$, called monovinylacetylene and found to correspond to the structural formula $H_2C=HC-C\equiv CH$.

In an application to Carothers and Collins, Ser. No. 490,538, filed October 22, 1930, there is described a process for preparing hydrogenhalide addition products of monovinylacetylene, the most important of which are the halogen-2-butadiene-1,3 products. This process depends upon the previous preparation of monovinylacetylene, one of the compounds formed in the Nieuwland reaction, which is then reacted with a hydrogenhalide. This reaction may take place in the absence of a catalyst, but it is preferably effected in the presence of a catalyst, containing a metallic chloride, a preferred form of which is similar to that described in the Nieuwland application above referred to, as suitable for the polymerization of acetylene to open chain polymers. For example, one form of catalyst used for the reaction between monovinylacetylene and hydrogen chloride comprises an aqueous solution of ammonium chloride and cuprous chloride. In the process described in the Carothers and Collins application referred to, the hydrogen chloride is preferably present in the form of an aqueous hydrochloric acid solution added to the catalyst mixture.

Further it has been described in an application to J. A. Nieuwland, Ser. No. 225,848, filed October 14, 1927, issued as Patent No. 1,812,542 on June 30, 1931 that acetylene may be made to combine directly with hydrogen chloride to form vinyl chloride in the presence of a catalyst of the type described in J. A. Nieuwland application, Ser. No. 305,866, above referred to, the hydrogen chloride reactant being added to the catalyst mixture in the form of concentrated hydrochloric acid. The following example illustrates the process of making vinyl chloride according to Nieuwland's disclosure.

Example A

In one of the specific embodiments of the invention, a mixture of 1,000 grams ammonium chloride, 1,000 grams hydrochloric acid of specific gravity approximately 1.194 (or greater), 3,000 grams cuprous chloride and 100 grams copper powder is agitated thoroughly while passing into it acetylene gas. Rapid absorption of the gas takes place with the formation of a gray to almost white precipitate. The temperature may rise as high as 40° C. during the reaction with no injurious effect other than a diminution in the absorption rate, but it is preferable to hold the temperature down to about 20° C. by suitable cooling of the reaction mixture. The acetylene may be passed in at atmospheric or higher pressures, preferably the latter. When the reaction slows up, as shown by a marked decrease in the rate of absorption of acetylene, the operation is discontinued and the vinyl chloride, together with some hydrochloric acid and some acetylene, are evolved from the reaction mixture by the application of heat. Any water lost in this distillation is replaced in the reaction mass, which, after cooling and saturating with dry gaseous hydrochloric acid, is again ready for the absorption of acetylene. This cycle of operation can be repeated indefinitely and a given lot of cuprous chloride thus used to bring about the reaction of an indefinite amount of acetylene and hydrochloric acid.

The hydrochloric acid used in the above example has a concentration of about 38% hydrogen chloride by weight. For the formation of vinyl chloride according to the conditions outlined in the Nieuwland disclosure, it is essential to use hydrochloric acid solutions having high concentration of hydrogen chloride.

In an application of J. A. Nieuwland, Ser. No. 505,463, filed December 29, 1930, there is embodied a method of increasing the efficiency of the polymerization catalyst described in Nieuwland application Ser. No. 305,866, by adding to the catalyst an amount of inorganic acid, preferably hydrochloric acid. The following example illustrates an adaptation of this method.

Example B

A mixture is prepared containing 70 parts of cuprous chloride, 27 parts of ammonium chloride, 7 parts of finely divided copper powder, 30 parts of water and 2.1 parts of commercial hydrochloric acid (37%). This mixture is agitated thoroughly while passing into it acetylene gas. Rapid absorption of the gas takes place and the temperature may rise as high as 50° C. during the course of the reaction without causing trouble, but it is preferable to hold it down to about 25° C. by suitable cooling. When the absorption indicates that the reaction has slowed up, the operation is discontinued, the mass allowed to stand for 24 hours or more and the highly unsaturated hydrocarbon formed is obtained by distilling. The distillation is stopped when the hydrocarbon condensed is mixed with much water. The water is separated and returned to the reaction mass which, after cooling and addition of hydrochloric acid to make up for any losses sustained during the reaction, is ready for the absorption of more acetylene. This cycle of operation can be repeated indefinitely and a given lot of cuprous chloride may be thus used for the conversion of an indefinite amount of acetylene. Purification of the constituents of this product may be accomplished by fractional distillation; thus one obtains vinylacetylene in a fraction collected from 0 to 10° C.; divinylacetylene in the fraction boiling between 80° and 90° C. and higher nonbenzenoid polymers of acetylene, including a tetramer, $C_8H_8$, boiling at higher temperatures. The latter should be removed in vacuo.

In the preparation of the catalyst described in Nieuwland Ser. No. 505,463, and illustrated in Example B, a portion of the water comprising the aqueous vehicle for the catalyst described in Nieuwland Ser. No. 305,866, is substituted by concentrated hydrochloric acid, resulting in the formation of a catalyst vehicle comprising dilute hydrochloric acid which must contain ionizable hydrogen not in excess of 0.2% by weight of the cuprous salt present in the catalyst mixture.

· Objects of invention

An object of the present invention pertains to the novel process of preparing halogen derivatives of butadiene by direct interaction of acetylene and a hydrogen-halide. A more specific object comprises the utilization of this method in the formation of chloro-2-butadiene-1,3.

Description of the invention

In accordance with the present invention it has been found that by passing acetylene into a cuprous catalyst containing a hydrohalic acid of a concentration within a range intermediate between the concentration operable for the formation of appreciable yields of vinyl halide and that suitable for the efficient preparation of polymers of acetylene, halogen-2-butadienes are formed in large amounts and may be readily separated from other products of the reaction.

The novel process is typified by the following examples.

Example 1

Two hundred g. of cuprous chloride and 100 g. of ammonium chloride are dissolved in 250 g. of aqueous hydrochloric acid solution containing 14% of hydrogen chloride by weight. This corresponds to 0.8% ionizable hydrogen taken on the basis of the cuprous copper present. Ten g. of copper wire are added to reduce traces of cupric chloride to cuprous chloride and maintain the copper salt in the cuprous form. Acetylene is continuously passed into the solution, maintained at a temperature of 60° C., the solution being rapidly stirred in such a way as to reduce the acetylene to very fine bubbles so as to present a maximum amount of gas surface. The gas and vapors issuing from the solution are passed through a condenser maintained at a temperature of −20° C. in which is condensed a mixture of chloro-2-butadiene-1,3, divinylacetylene, monovinylacetylene, and some acetaldehyde. The uncondensed gas, consisting chiefly of monovinylacetylene and acetylene, may if desired be returned to the reaction zone for further conversion to chloro-2-butadiene-1,3. Hydrogen chloride is added from time to time or continuously to replace the hydrogen chloride which has reacted to form chloro-2-butadiene-1,3, thereby maintaining the proper concentration of acid, and making the process continuous. The hydrogen chloride may be added in the form of concentrated hydrochloric acid or as hydrogen chloride gas, which is readily absorbed in the solution. The liquid mixture collected in the condenser is warmed to about 35° C., most of the monovinylacetylene and a part of the acetaldehyde distilling off. The remaining liquid condensate is slowly and carefully distilled under a reduced pressure of 400 mm. through a still fitted with a two-foot column packed with carborundum and surmounted by a dephlegmator. The receiver of this still is immersed in a mixture of solid carbon dioxide and acetone to assist in condensing the volatile products. Of the mixture being distilled, 18.6% distills below 30° C. and consists of monovinylacetylene, acetaldehyde and some chloro-2-butadiene-1,3; there is practically no distillate between 30° and 38° C.; 17.6% distills between 38° C. and 45° C., and comprises substantially pure chloro-2-butadiene-1,3; 3.8% distills between 45° C. and 60° C., and comprises a mixture of chloro-2-butadiene-1,3 and divinylacetylene; 30.2% distills between 60° C. and 65° C. and is substantially pure divinylacetylene; 21.1% remains uncondensed and consists largely of monovinylacetylene which is returned to the reaction zone; 8.7% remains as undistilled residue and probably contains high boiling polymers of chloro-2-butadiene-1,3 and of divinylacetylene. The fraction boiling below 30° C. on warming to room temperature yields 8.9% monovinylacetylene on the basis of the total weight of the original condensate. Washing with sodium bisulfite solution removes 3% acetaldehyde on the basis of the weight of the original condensate, leaving a residue of 6.7% of substantially pure chloro-2-butadiene-1,3. The following table gives the total percentages of substances isolated from the above typical distillation:

| | Percent |
|---|---|
| Pure chloro-2-butadiene-1,3 | 24.3 |
| Pure divinylacetylene | 30.2 |
| Monovinylacetylene | 30.0 |
| Acetaldehyde | 3.0 |
| Mixture of chloro-2-butadiene-1,3 and divinylacetylene | 3.8 |
| Residue | 8.7 |
| | 100.0 |

The relatively small amount of chloro-2-butadiene-1,3-divinylacetylene mixture may be separated almost completely into its components by another fractional distillation.

Chloro-2-butadiene-1,3 may be prepared directly from acetylene and hydrogen chloride, using a discontinuous rather than a continuous process of the type described in Example 1. This is illustrated in the following example:

Example 2

Using the same catalyst-hydrochloric acid mixture as in Example 1 in a closed vessel from which the reaction products are prevented from escaping, acetylene is passed at room temperature into the aqueous mixture with rapid agitation until no more acetylene is absorbed. The mixture, charged with acetylene, is then heated to 80° C., and the vapors given off, which contain chloro-2-butadiene-1,3, monovinylacetylene, divinylacetylene, and acetaldehyde, are condensed and worked up as in Example 1. The cuprous chloride catalyst is then ready for the absorption of more acetylene. As in Example 1, the concentration of hydrogen chloride may be maintained within the proper limits by the addition of more acid from time to time. In general, this batch process is less convenient than the continuous process described in Example 1.

The conditions set forth in the above examples for the preparation of chloro-2-butadiene-1,3 may be varied quite widely while still obtaining substantial yields of chloro-2-butadiene-1,3. The concentration of hydrochloric acid solution used may be varied between 6% and 15% by weight of dry hydrogen chloride. At an acid concentration just slightly above 15% hydrogen chloride, traces of vinyl chloride will form, while at a concentration of 18% hydrogen chloride and above, vinyl chloride forms in substantial amounts, becoming the principal product of the reaction as the hydrogen chloride concentration is progressively increased. On the other hand, at concentrations progressively decreasing below 6% of hydrogen chloride, the ratio of divinylacetylene to chloro-2-butadiene-1,3 increases so rapidly that the latter cannot be economically separated. It is essential that the hydrochloric acid concentration and the other reaction conditions be regulated to favor the reaction:

$$2HC\equiv CH + HCl \rightarrow H_2C=HC-C(Cl)=CH_2$$

The rate of this reaction is favorably influenced by a proper ratio of cuprous salt to hydrochloric acid, the preferred ratio being in the neighborhood of 0.8% ionizable hydrogen on the basis of dissolved cuprous salt. The ratio may however be varied within a range considerably above and below this figure if the proper concentrations of hydrochloric acid are maintained.

The most favorable temperatures for the reaction lie between 40° C. and 100° C. Below 40° C. the reaction is slow and the catalyst tends to crystallize from the solution in large amounts, while above 100° C. the loss of hydrogen chloride by volatilization is appreciable and the amount of polymerization of chloro-2-butadiene-1,3 is greatly increased.

The catalyst described in the above examples is a preferred form of catalyst but its specific character may be varied. Thus the ammonium chloride of the catalyst may be replaced by any ionizable salt, preferably a chloride, which is capable of forming water-soluble double copper salts and which does not oxidize the cuprous chloride to cupric chloride under the conditions of the reaction for the formation of chloro-2-butadiene-1,3 as described above. The chlorides of calcium, lithium, sodium, potassium, rubidium, and cesium may be used as well as substituted ammonium chlorides particularly tertiary amine chlorides such as tributylamine hydrochloride and pyridinium chloride. Mixtures of the above chlorides may also be advantageously used. Furthermore, the concentration of cuprous chloride and of ammonium chloride or other suitable salt used in its place may be varied from the concentrations of the above examples. It is, in general, desirable, however, to have a maximum concentration of cuprous chloride in the catalyst solution since the rate of reaction depends in part upon this concentration. Thus although cuprous chloride dissolves to some extent in the dilute hydrochloric acid, such as is used in the above examples, without the addition of ammonium chloride or other chloride, and although such a catalyst solution functions for the formation of chloro-2-butadiene-1,3, a greater concentration of cuprous chloride is obtained with consequent greater efficiency of the catalyst by the addition of ammonium or other chloride. In general, the concentration of the cuprous chloride increases with increasing concentration of ammonium chloride or other chloride. It will be seen from this discussion that it is desirable to add both the cuprous chloride and the ammonium or other salt in such amounts as to saturate the catalyst solution under the conditions under which it is to be used and to leave a slight undissolved excess of these two chlorides or their double salts in equilibrium with the solution. In addition, it is generally advantageous to have metallic copper present in the form of wire or powder to maintain all the dissolved copper in the cuprous state.

The general method described in Examples 1 and 2 for the preparation of chloro-2-butadiene-1,3, may be used for the preparation of other analogous halogen-2-butadienes. For example, in the preparation of bromo-2-butadiene-1,3, the general procedure set forth in Examples 1 and 2 is followed, cuprous bromide being substituted for cuprous chloride, ammonium bromide for ammonium chloride, and hydrobromic acid for hydrochloric acid. Other bromides may be substituted for ammonium bromide just as other chlorides described above may be substituted for ammonium chloride. Since bromo-2-butadiene-1,3 has a boiling point close to that of divinylacetylene, its separation from divinylacetylene by distillation is consequently more difficult than in the case of chloro-2-butadiene-1,3 and may require several careful fractional distillations using the apparatus described in Example 1.

The above examples are to be taken as illustrative only and the description must not be construed as limiting the scope of the invention. Variations from the specific preferred conditions herein outlined which are within the spirit of the invention should be considered as being within the scope of the claims.

I claim:

1. A process for preparing halogen-2-butadiene-1,3 which comprises passing acetylene in contact with an aqueous solution of a cuprous halide, a halide salt which increases the solubility of the cuprous halide, and a hydrogen halide, the concentration of hydrogen halide being 6 to 15% whereby to selectively favor the reaction:

$$2HC\equiv CH + Hhal \rightarrow H_2C=HC-C(hal)=CH_2$$

2. A process for preparing halogen-2-butadiene-1,3 which comprises passing acetylene in contact with an aqueous solution of a cuprous halide, an ammonium halide, and a hydrogen halide, the concentration of hydrogen halide being 6 to 15% whereby to selectively favor the reaction:

$$2HC\equiv CH + Hhal \rightarrow H_2C=HC-C(hal)=CH_2$$

3. A process for preparing halogen-2-butadiene-1,3 which comprises passing acetylene in ,contact with an aqueous solution of a cuprous halide, a substituted ammonium halide, and a hydrogen halide, the concentration of hydrogen halide being 6 to 15% whereby to selectively favor the reaction:

$$2HC{\equiv}CH + Hhal \rightarrow H_2C{=}HC{-}C(hal){=}CH_2$$

4. A process for preparing halogen-2-butadiene-1,3 which comprises passing acetylene in contact with an aqueous solution of a cuprous halide and a hydrogen halide, the concentration of hydrogen halide being 6 to 15% whereby to selectively favor the reaction:

$$2HC{\equiv}CH + Hhal \rightarrow H_2C{=}HC{-}C(hal){=}CH_2$$

5. The process for preparing bromo-2-butadiene-1,3 which comprises passing acetylene in contact with an aqueous solution of a cuprous halide and hydrogen bromide, the hydrogen bromide being present in a concentration of from 6 to 15% whereby to selectively favor the reaction:

$$2HC{\equiv}CH + HBr \rightarrow H_2C{=}HC{-}C(Br){=}CH_2$$

6. The process for preparing bromo-2-butadiene-1,3 which comprises passing acetylene in contact with an aqueous solution of a cuprous halide, a halide salt which increases the solubility of the halide, and hydrogen bromide, the hydrogen bromide being present in a concentration of from 6 to 15% whereby to selectively favor the reaction:

$$2HC{\equiv}CH + HBr \rightarrow H_2C{=}HC{-}C(Br){=}CH_2$$

7. The process for preparing bromo-2-butadiene-1,3 which comprises passing acetylene in contact with an aqueous solution of a cuprous halide, an ammonium halide, and hydrogen bromide, the hydrogen bromide being present in a concentration of from 6 to 15% whereby to selectively favor the reaction:

$$2HC{\equiv}CH + HBr \rightarrow H_2C{=}HC{-}C(Br){=}CH_2$$

8. The process for preparing bromo-2-butadiene-1,3 which comprises passing acetylene in contact with an aqueous solution of a cuprous bromide, an ammonium bromide, and hydrogen bromide, the hydrogen bromide being present in a concentration of from 6 to 15% whereby to selectively favor the reaction:

$$2HC{\equiv}CH + HBr \rightarrow H_2C{=}HC{-}C(Br){=}CH_2$$

9. A process for preparing chloro-2-butadiene-1,3 which comprises passing acetylene in contact with an aqueous solution of a cuprous halide and hydrogen chloride, the hydrogen chloride being present in a concentration of from 6 to 15% which will favor the reaction:

$$2HC{\equiv}CH + HCl \rightarrow H_2C{=}HC{-}C(Cl){=}CH_2$$

10. A process for preparing chloro-2-butadiene-1,3 which comprises passing acetylene in contact with a hydrochloric acid solution of a cuprous halide and a halide salt which increases the solubility of the cuprous salt, the concentration of the hydrogen chloride being 6 to 15% whereby to favor the reaction:

$$2HC{\equiv}CH + HCl \rightarrow H_2C{=}HC{-}C(Cl){=}CH_2$$

11. A process for preparing chloro-2-butadiene-1,3 which comprises passing acetylene in contact with a hydrochloric acid solution of cuprous chloride and an ammonium halide, the concentration of the hydrochloric acid being 6 to 15% whereby to favor the reaction:

$$2HC{\equiv}CH + HCl \rightarrow H_2C{=}HC{-}C(Cl){=}CH_2$$

12. A process for preparing chloro-2-butadiene-1,3 which comprises passing acetylene in contact with a hydrochloric acid solution of a cuprous halide and ammonium chloride, the concentration of the hydrochloric acid being 6 to 15% whereby to favor the reaction:

$$2HC{\equiv}CH + HCl \rightarrow H_2C{=}HC{-}C(Cl){=}CH_2$$

13. A process for preparing chloro-2-butadiene-1,3 which comprises passing acetylene in contact with a hydrochloric acid solution of a cuprous halide in which the concentration of hydrochloric acid is maintained between 6% and 15% hydrogen chloride, and in which the ionizable hydrogen present is about 0.8% of the cuprous copper in solution.

14. A process for preparing chloro-2-butadiene-1,3 which comprises passing acetylene in contact with a hydrochloric acid solution of a cuprous halide in which the concentration of hydrochloric acid is maintained between 6% and 15% hydrogen chloride, maintaining the temperature during the reaction between 40° C. and 100° C.

15. A process for preparing chloro-2-butadiene-1,3 which comprises passing acetylene through a hydrochloric acid solution of cuprous chloride in which the concentration of hydrochloric acid is maintained between 6% and 15% hydrogen chloride.

16. A process for preparing chloro-2-butadiene-1,3 which comprises passing acetylene through a hydrochloric acid solution of cuprous chloride and ammonium chloride in which the concentration of hydrochloric acid is maintained between 6% and 15% hydrogen chloride.

17. A process for preparing chloro-2-butadiene-1,3 which comprises passing acetylene in contact with a hydrochloric acid solution of a cuprous chloride in which the concentration of hydrochloric acid is maintained between 6% and 15% hydrogen chloride, removing the products from the reaction zone, and recovering therefrom chloro-2-butadiene-1,3.

18. A process for preparing chloro-2-butadiene-1,3 which comprises passing acetylene through a hydrochloric acid solution of cuprous chloride and ammonium chloride in which the concentration of hydrochloric acid is maintained between 6% and 15% hydrogen chloride, maintaining the temperature during the reaction period between 40° C. and 100° C., withdrawing from the reaction zone the products of the reaction in the form of a vapor-gas mixture, subjecting the said mixture to fractional condensation, and recovering the condensed chloro-2-butadiene-1,3.

19. The process of claim 1 characterized in that metallic copper is present in the aqueous medium.

20. The process of claim 16 characterized in that metallic copper is present in the acid medium.

ARNOLD M. COLLINS.